US008639738B2

(12) United States Patent
Liao et al.

(10) Patent No.: US 8,639,738 B2
(45) Date of Patent: Jan. 28, 2014

(54) METHOD FOR CARRY ESTIMATION OF REDUCED-WIDTH MULTIPLIERS

(75) Inventors: Yen-Chin Liao, Taipei (TW); Hsie-Chia Chang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 520 days.

(21) Appl. No.: 12/932,530

(22) Filed: Feb. 28, 2011

(65) Prior Publication Data

US 2011/0185000 A1 Jul. 28, 2011

Related U.S. Application Data

(63) Continuation-in-part of application No. 11/787,716, filed on Apr. 17, 2007, now abandoned.

(30) Foreign Application Priority Data

Dec. 29, 2006 (TW) ................................ 95149774 A

(51) Int. Cl.
*G06F 7/38* (2006.01)
*G06F 7/52* (2006.01)

(52) U.S. Cl.
USPC ............ 708/551; 708/550; 708/620; 708/625

(58) Field of Classification Search
USPC .................................. 708/550–551, 620–632
See application file for complete search history.

(56) References Cited

U.S. PATENT DOCUMENTS

| 5,694,349 | A | 12/1997 | Pal | |
|---|---|---|---|---|
| 6,122,654 | A | 9/2000 | Zhou et al. | |
| 6,363,084 | B1 | 3/2002 | Dejonghe | |
| 6,978,426 | B2 * | 12/2005 | Parhi et al. | 708/629 |
| 7,080,115 | B2 | 7/2006 | Parhi et al. | |
| 2002/0032713 | A1 * | 3/2002 | Jou et al. | 708/625 |
| 2003/0220956 | A1 * | 11/2003 | Parhi et al. | 708/620 |
| 2005/0144217 | A1 * | 6/2005 | Parhi et al. | 708/625 |

FOREIGN PATENT DOCUMENTS

| TW | 396321 | 7/2000 |
|---|---|---|
| TW | 484092 | 4/2002 |

OTHER PUBLICATIONS

L. D. Van, S. S. Wang, and W. S. Feng, "Design of the lower-error fixed-width multiplier and its application", IEEE Trans. Circuits Syst. II, vol. 47, pp. 1112-1118, Oct. 2000.*
L. D. Van and C. C. Yang, "Generalized low-error area-efficient fixed width multipliers," IEEE Trans. Circuits Syst. I, vol. 52, No. 8, pp. 1608-1619, Aug. 2005.*
H.-A. Huang, Y.-C. Liao and H.-C. Chang, "A self-compensation fixed-width booth multiplier and its 128-point FFT applications," Proc. IEEE Int. Symp. Circuits Syst., pp. 3538-3541, 2006.*
Y.-C. Liao, H.-C. Chang and C.-W. Liu, "Carry estimation for two's complement fixed-width multipliers," Proc. IEEE Workshop Signal Processing Systems, pp. 345-350, 2006.*

(Continued)

*Primary Examiner* — Chat Do
*Assistant Examiner* — Matthew Sandifer
(74) *Attorney, Agent, or Firm* — Bucknam and Archer

(57) ABSTRACT

A low-error reduced-width multiplier is provided by the present invention. The multiplier can dynamically compensate the truncation error. The compensation value is derived by the dependencies among the multiplier partial products, and thus, can be analyzed according to the multiplication type and the multiplier input statistics.

4 Claims, 7 Drawing Sheets

(56) References Cited

OTHER PUBLICATIONS

K. J. Cho and J. G. Chung, "Low-Error Fixed-Width Two's Complement Squarer Design Using Booth-Folding Technique," IET Comput. Digit. Tech., vol. 1, No. 4, pp. 414-422, Jul. 2007.*
S. J. Jou and H. H.Wang, "Fixed-width multiplier for DSP application," IEEE Int. Symp. Computer Design, pp. 318-322, Sep. 2000.*
S. J. Jou, M. H. Tsai, and Y. L. Tsao, "Low-error reduced-width multipliers for DSP applications," IEEE Trans. Circuits Syst. I, vol. 50, pp. 1470-1474, Nov. 2003.*
J. M. Jou, S. R. Kuang, and R. D. Chen, "Design of low-error fixed-width multiplier for DSP applications," IEEE Trans. Circuits Syst. II, vol. CAS-46, No. 6, pp. 836-842, Jun. 1999.*
Y.C. Lim, "Single-Precision Multiplier with Reduced Circuit Complexity for Signal Processing Applications," IEEE Trans. on Computers, vol. 41, pp. 1333-1336, Oct. 1992.
M.J. Schulte and Earl E. Swartzlander, Jr., "Truncated Multiplication with Correction Constant," in Workshop on VLSI Signal Processing, Oct. 1993, pp. 388-396.
S.S. Kidambi, F. El-Guibaly, and A. Antoniou, "Area-Efficient Multipliers for Digital Signal Processing Applications," IEEE Trans. on Circuits and Syst. II, vol. 43, No. 2, pp. 90-95, Feb. 1996.
T.B. Juang and S.F. Hsiao, "Low-Error Carry-Free Fixed-Width Multipliers with Low-Cost Compensation Circuits," IEEE Trans. on Circuits and Syst. II, vol. 52, No. 6, pp. 299-303, Jun. 2005.
L.D. Van and C.C. Yang, "Generalized Low-Error Area-Efficient Fixed-Width Multipliers," IEEE Trans. on Circuits and Syst.. I, vol. 52, No. 8, pp. 1608-1619, Aug. 2005.
V.G. Oklobdzija, D. Villeger, and T. Soulas, "An integrated multiplier for complex numbers", Journal of VSLI Signal Processing, No. 7, pp. 213-222, 1994.

\* cited by examiner

| Type | Estimation of $\lambda$ | Remark |
|---|---|---|
| First, a type | $2^{-z}\sum_{j=0}^{n-z-1} a_j$ | $A = -a_{n-1}2^{n-1} + \sum_{j=0}^{n-2} a_j 2^j$ |
| First, b type | $2^{-z}\sum_{l=0}^{n-z-1} b_l$ | $B = -b_{n-1}2^{n-1} + \sum_{l=0}^{n-2} b_l 2^l$ |
| Second, $\alpha$ type | $2^{-z}\sum_{j=0}^{n-z-1}\left(\frac{\alpha_j}{3}+\frac{1}{6}\right)\left(1-2^{-(n-z-j)}\right)$ | $\beta = P_{0,n-z} + P_{n-z,0} + \sum_{l=1}^{n-z-1} P_{l,n-l-1}$ |
| Second, $\beta$ type | $2^{-z}\sum_{l=0}^{n-z-1}\left(\frac{\beta_l}{3}+\frac{1}{6}\right)\left(1-2^{-(n-z-l)}\right)$ | $= P_{0,n-z} + P_{n-z,0} + \sum_{j=0}^{n-z-1} P_{n-j-z,j}$ $\alpha_j = P_{n-j-z,j}, \beta_l = P_{l,n-l-z}$ |

Figure 5.

| Bit Width (n) | Z=1 | Z=2 | Z=3 |
|---|---|---|---|
| 8 | $\lfloor\frac{1}{2}(\beta-\beta_{n-1}+1)\rfloor$ | if $\beta-\beta_{n-z}=0$ <br> $\lfloor\frac{1}{2}(\beta-\beta_{n-z}+1)\rfloor$ otherwise | $\lfloor\frac{1}{2}(\beta-\beta_{n-z})\rfloor$ |
| 10 | if $\beta-\beta_{n-1}=0$ <br> $\lfloor\frac{1}{2}(\beta-\beta_{n-1}+2)\rfloor$, otherwise | $\lfloor\frac{1}{2}(\beta-\beta_{n-z})\rfloor$ $+\text{mod}(\beta-\beta_{n-z},2)$ | if $\beta-\beta_{n-z}=1$ <br> $\lfloor\frac{1}{2}(\beta-\beta_{n-z})\rfloor$ otherwise |
| 12 | $\lfloor\frac{1}{2}(\beta-\beta_{n-1}+2)\rfloor$ | $\lfloor\frac{1}{2}(\beta-\beta_{n-z}+2)\rfloor$ | $\lfloor\frac{1}{2}(\beta-\beta_{n-z})\rfloor$ if $\beta-\beta_{n-z}>3$ <br> $\lfloor\frac{1}{2}(\beta-\beta_{n-z}+1)\rfloor$ otherwise |
| 14 | $\lfloor\frac{1}{2}(\beta-\beta_{n-1}+3)\rfloor$ | $\lfloor\frac{1}{2}(\beta-\beta_{n-z}+2)\rfloor$ if $0\leq\beta-\beta_{n-z}<4$; <br> $\lfloor\frac{1}{2}(\beta-\beta_{n-z}+1)\rfloor$ if $4\leq\beta-\beta_{n-z}<9$; <br> $\lfloor\frac{1}{2}(\beta-\beta_{n-z})\rfloor$ otherwise | $\lfloor\frac{1}{2}(\beta-\beta_{n-z}+2)\rfloor$ if $0\leq\beta-\beta_{n-z}<2$; <br> $\lfloor\frac{1}{2}(\beta-\beta_{n-z}+1)\rfloor$ if $2\leq\beta-\beta_{n-z}<7$; <br> $\lfloor\frac{1}{2}(\beta-\beta_{n-z})\rfloor$ otherwise |
| 16 | $\lfloor\frac{1}{2}(\beta-\beta_{n-1}+3)\rfloor$ | $\lfloor\frac{1}{2}(\beta-\beta_{n-z}+2)\rfloor$ | $\lfloor\frac{1}{2}(\beta-\beta_{n-z}+2)\rfloor$ |

Figure 6.

| Type | Estimation of λ |
|---|---|
| First Type | $2^{-(z+1)} \sum_{i=0}^{\lfloor n/2 \rfloor - \lfloor z/2 \rfloor} y_{i^*}$, $y_{i^*} = \begin{cases} 1, \text{if } \not\in En(b_{2i-1}, b_{2i}, b_{2i-1}) \neq 0 \\ 0_{\text{otherwise}} \end{cases}$<br>In the above equation, En( ) denotes Booth Encoding. |
| Second Type | $2^{-z}\left(\frac{\beta}{10} + \frac{3}{20}\lceil \frac{n}{2} \rceil\right)$ |
| Third Type | $2^{-z}\left(\frac{3}{8}\lceil \frac{n}{2} \rceil\right)$ |

_US 8,639,738 B2_

METHOD FOR CARRY ESTIMATION OF REDUCED-WIDTH MULTIPLIERS

CROSS REFERENCE TO RELATED APPLICATIONS

This is a continuation-in-part of pending application Ser. No. 11/787,716, filed Apr. 17, 2007.

FIELD OF THE INVENTION

The present invention relates to a method of a multiplier operation, and in particular relates to a method of operation of a low-error reduced-width multiplier.

BACKGROUND OF THE INVENTION AND PRIOR ART

Multiplier is one of the most common basic operations for digital signal processing. When performing a digital signal processing, in order to prevent data's bit width from overflow as the operation burden increases, therefore multiplication operation usually incorporates a reduced (or fixed) width characteristic so as to prevent the occurrence of the case of the numerical overflow during the process of the operation. Generally speaking, the reduced-width characteristic is commonly realized by employing a post-truncated multiplier, where the truncation operation is executed at the output of the multiplier in order to maintain the fixed width of bits. In contrast to the post-truncated multiplier, the direct-truncated multiplier only executes a partial product accumulation on the portions that are willing to preserve the output bit of the multiplication so as to reduce the computation complexity; but, however, usually it will result in a relatively large error.

For the direct-truncated fixed-width multiplier, the bit width of input/output is the same; and for the fixed-width multiplier, the error is compensated by adding a number. However, error compensation methods proposed in prior arts are only applicable for multipliers that utilize a single partial product generating approach, and most of them need to be accompanied with an acquisition of a large amount of simulation auxiliary compensated terms. Because of the lack of effective analysis method, it is difficult to further apply to the system-level analysis. Therefore, a direct-truncated multiplier of the known art only realizes the partial product accumulation corresponding to the remaining parts after truncation.

Figure depicts a circuit block diagram of a well-known multiplier, in which the bit width of an input data A is $n_1$, and the bit width of an input data B is $n_2$. The product of these two inputs has a bid width of $(n_1+n_2)$ bits. This product must be truncated by the truncator (denoted by T) in order to keep the bit width at n ($n£n_1+n_2$) bits and therefore to prevent overflow.

Although there are many kinds of method being proposed in the literature to compensate for this error, however, they all are applicable for those multipliers which utilize a certain partial product generating method. Hereafter a survey of patent literature and non-patent literature relevant to the present invention will be given and analyzed as follows:

1. R.O.C. Patent No. 396321, Jul. 1, 2000, "Low-Error Fixed-Width 2's Complement Parallel Multiplier." This patent application only provided a compensation for a 2's complement fix-width multiplier, which may dynamically generate a quantity of compensation in accordance with the input value of the multiplier, but, however, due to the lack of theoretic analysis, it is not able to mitigate errors in accordance with the statistical characteristics of the input data, and furthermore it is not applicable for the multipliers that adopt different partial products generating methods.

2. R.O.C. Patent No. 484092, Apr. 21, 2002, "A Reducible Bit Length Low-Error Multiplier." This patent application provided a dynamic compensation method for a 2's complement and modified Booth multipliers. The mechanism for generating an amount of compensation is simple, but is not able to efficiently compensate for errors.

3. K. K. Parhi, J. G. Chung, K. C. Lee, and K. J. Cho, "Low-Error Fixed-Width Modified Booth Multiplier," Dec. 20, 2005, U.S. Pat. No. 6,978,426B2. This patent application provided a dynamic compensation method for the modified Booth multiplier, which is able to effectively compensate for errors; but, however, the hardware complexity for generating a quantity of compensation may increase as the width of the input of the multiplier become larger.

4. Y. C. Lim, "Single-Precision Multiplier with Reduced Circuit Complexity for Signal Processing Applications," IEEE Trans. Computers, Vol. 41, pp. 1333-1336, October 1992. This non-patent literature proposed generating a constant of compensation via a preliminary analysis, and also pointed out the concept of dynamic compensation, but, however, is lack of a detailed and concrete analysis and realization method.

5. M. J. Schulte and E. S. Jr., "Truncated Multiplication with Correction Constant," in Workshop on VLSI Signal Processing, October 1993, pp. 388-396.

6. S. S. Kidambi, F. El-Guibaly, and A. Antoniou, "Area-Efficient Multipliers for Digital Signal Processing Applications," IEEE Trans. Circuits Syst. II, Vol. 43, pp. 90-95, February 1996.

(A) The non-patent literature, item 5 and item 6 mentioned above, both proposed a constant compensation method, which is not able to effectively compensate for errors.

(B) The non-patent literature, item 4 to item 6 mentioned above, put a special emphasis on the constant compensation method, which, besides being not able to effectively compensate for errors, it is also difficult to change the way of analysis in accordance with different generating method for partial products.

7. T. B. Juang and S. F. Hsiao, "Low-Error Carry-Free Fixed-Width Multipliers with Low-Cost Compensation Circuits," IEEE Trans. Circuits Syst. II, Vol. 52, No. 6, pp. 299-303, June 2005. This non-patent literature provided a dynamic compensation mechanism only for signed-magnitude modified Booth multiplier, and did not provide any other multiplication compensation method for different partial products generating methods.

8. L. D. Van and C. C. Yang, "Generalized Low-Error Area-Efficient Fixed-Width Multipliers," IEEE Trans. Circuits Syst. I, Vol. 52, No. 8, pp. 1608-1619, August 2005. This non-patent literature can be treated as a derivative of the above-mentioned patent literature item 1, but these two methods were designed only for 2's complement fixed-width multipliers, and are not appropriate for other multipliers employing different partial products generating method.

SUMMARY OF THE INVENTION

One of the objectives of the present invention is to provide an operational method of a low-error reduced-width multiplier for reducing computational complexity and compensating for truncation errors, which is applicable to different types of multipliers.

Another objective of the present invention is to provide a low-error reduced-width multiplier for reducing computational complexity and compensating for truncation errors.

Another objective of the present invention is to provide a method for carry estimation of truncated-width multiplier, comprising: (a) processing a n-bit Baugh-Wooly 2's complement multiplier and an input multiplication of A×B, where $$A = -a_{n-1}2^{n-1} + \sum_{j=0}^{n-2} a_j 2^j;\ B = -b_{n-1}2^{n-1} + \sum_{i=0}^{n-2} b_i 2^i,$$

to generate a first group of n partial products and a second group of n partial products; (b) associating each partial product of the first group with a most significant part (MSP) and associating each partial product of the second group with a least significant part (LSP); (c) dividing the least significant part (LSP) into two groups, a first least significant group of $$\beta = \sum_{i=0}^{n-1} P_{i,n-i-1},$$

$P_{i,j}=a_j b_i$, which contains a plurality of elements ($P_{i,j}$) of partial product of $P_{i,j}=a_j b_i$ depending on input information ($a_j$, $b_i$), and a second least significant group containing n−1 bits; (d) truncating the second least significant group and using a compensating circuit to generate a estimated group of $$\lambda = \sum_{i=0}^{n-2} \sum_{j=0}^{n-i-2} P_{i,j} 2^{j-n}$$

in accordance with the input information implied in the first least significant group (β); (e) generating a carry estimation value of $$\sigma = 2^{n-z+1} \left\lfloor \frac{\beta}{2} + \lambda \right\rfloor_r,$$

where $\lfloor x \rfloor_r$ is a round operation for rounding x to its nearest number, for the most significant part (MSP) in accordance with the first least significant group (β) and a estimated group (λ); and (f) using an adder circuit to accumulate the most significant part (MSP) and the carry estimation value.

Another objective of the present invention is provided with a method for carry estimation of truncated-width multiplier, comprising: (a) processing a Booth-encoded multiplier and reducing the number of row in partial product of an input of $B=\{b_{n-1}, b_{n-2}, \ldots, b_0\}$ where $b_{-1}$ is equal to 0, into $$\left\lfloor \frac{n}{2} \right\rfloor;$$

(b) converting an input multiplication of A×B into an another multiplication of A×y, where $y=\{y_{\lfloor n/2 \rfloor -1}, y_{\lfloor n/2 \rfloor -2}, \ldots, y_0\}$), to generate a first group of n partial products and a second group of n partial products; (c) associating each partial product of the first group with a most significant part (MSP) and associating each partial product of the second group with a least significant part (LSP); (d) dividing the least significant part (LSP) into two groups, a first least significant group of $\beta=\{P_{0,n-1}, P_{1,n-3}, \ldots, P_{\lfloor n/2 \rfloor -t,1}\}$, which contains a plurality of elements ($P_{i,j}$) of partial product ($P_{ij}=a_j y_i$) depending on input information ($a_j$, $y_i$) and a second least significant group containing n−1 bits; (e) truncating the second least significant group and using a compensating circuit to generate a carry estimation value of $$\sigma = 2^n \left\lfloor \frac{\beta}{2} + \lambda \right\rfloor_r,$$

where $\lfloor x \rfloor_r$ is a round operation for rounding x to its nearest number, for the most significant part (MSP) in accordance with the input information implied in the first least significant group (β) and a estimated group (λ) and (f) using an adder circuit to accumulate the most significant part (MSP) and the carry estimation value in accordance with the first least significant group (β) and the estimated group (λ).

To achieve the above-mentioned objectives, in accordance with a first aspect of the present invention, there is provided an operational method of a low-error reduced-width multiplier for reducing computational complexity and compensating for truncation errors, comprising the following steps: dynamically generating a compensation term by using an input value of a multiplier; and an accumulating operation for which the part that is set to be the truncated part in the multiplier is omitted, while the compensation term is used for compensation, in order to reduce the width.

Furthermore, to achieve the above-mentioned objectives, in accordance with a second aspect of the present invention, there is provided a low-error reduced-width multiplier, in which the multiplier can reduce the width by an accumulating operation for which the part that is set to be the truncated part in the multiplier is omitted, while the compensation term dynamically generated by an input value is used for compensation.

Therefore, because of the utilization of an accumulating operation that use a dynamically generated compensation term to compensate for the part that is set to be a truncated part, the present invention is able to reduce the computational complexity and compensate for truncation errors, and is also applicable to different types of multipliers.

BRIEF DESCRIPTION OF THE DRAWINGS

For the purpose that the said and other objectives, characteristics, and advantages of the present invention can be clearly seen, and be easily and obviously understood, preferred embodiments of the present invention are subsequently described by referring to the enclosing drawings, wherein:

FIG. 5 and FIG. 6 depict, respectively, three kinds of diagrams of compensation generating formulae for used in different bit-width 2's complement multipliers.

DETAILED DESCRIPTION OF THE PREFERRED EMBODIMENTS

In the following, preferred embodiments of the present invention are subsequently described by referring to the enclosing drawings.

The present invention discloses a dynamic generation of compensation and estimation analysis method that is applicable to different bit-width and different parts of products generating procedure of a multiplier. By utilizing this analysis method, it is able to further provide a system level analysis so as to provide a design choice while considering the design cost such as complexity and compensation accuracy. In accordance with the present invention, to achieve low complexity, a direct-truncated multiplier together with a compensating circuit for dynamically generating a quantity of compensation are adopted, where the mechanism for dynamically generating compensation still fulfills the low-error and low-complexity requirements. In connection with those requirements, distribute the correlations among the elements of the products, and observe parts of the partial products to calculate and arrange the state expectation value of the partial products to serve as a quantity of compensation needed in the dynamic compensation. Therefore, the analysis method in accordance with the present invention has a low complexity, and is applicable to the multipliers employing different kinds of partial products generating methods. Hence, under the condition that the statistical characteristics of the input signals to the multiplier are known, it offers much more accurate compensation, and can further provide a system-level truncation error analysis.

The present invention can be used in LAN\WAN, DVB-T/H, xDSL and high-speed low-power signal processors (such as the kernel processor of fast Fourier transform (FFT) or digital filter, equalizer).

Figure 1:
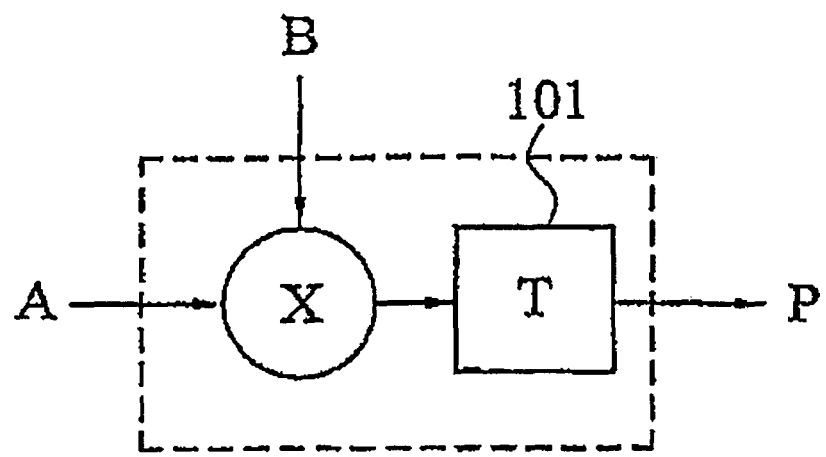
FIG. 1 depicts a circuit block diagram of a prior art multiplier.
Figure 2:
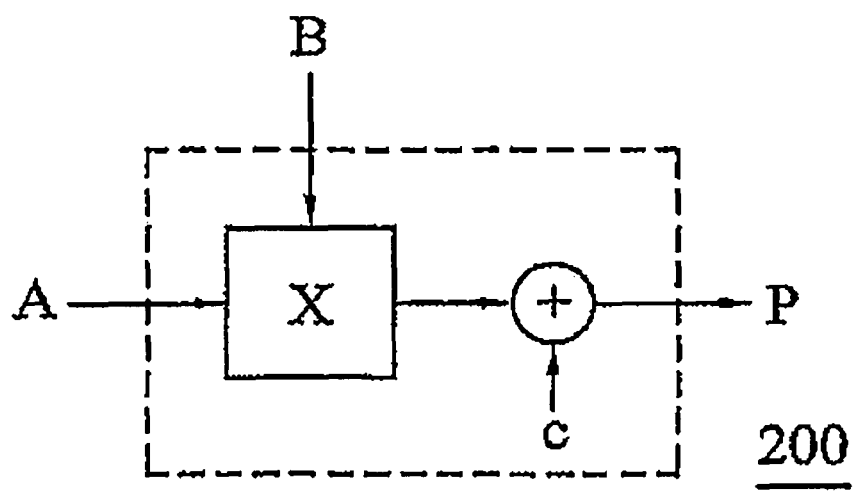
FIG. 2 depicts a circuit block diagram for an n-bit low-complexity reduced-width multiplier 200 proposed in a preferred embodiment of the present invention.
Figure 3:
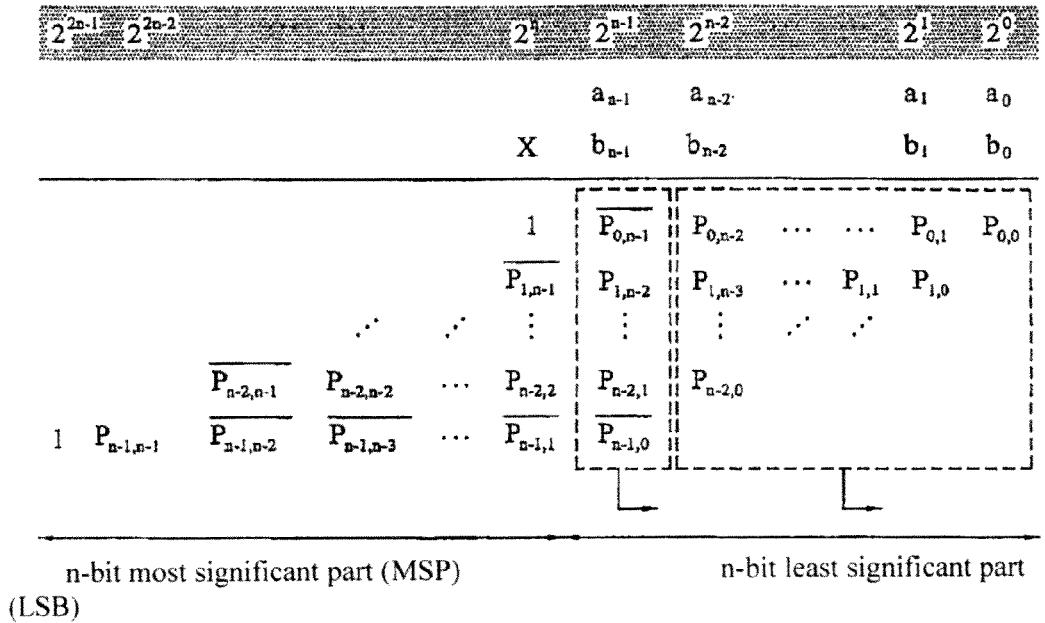
FIG. 3 depicts a partial product generating diagram for an n-bit low-complexity reduced-width multiplier 200.

FIG. 2 depicts a circuit block diagram for an n-bit low-complexity reduced-width multiplier 200 proposed in a preferred embodiment of the present invention. As shown in FIG. 2, a direct product of an A having $n_1$ bits and a B having $n_2$ bits results in a product of n bits; in the meantime, a compensation C is added to the product in order to correct the induced error while decreasing the complexity. The computational complexity and hardware cost of a low-complexity reduced-width multiplier 200 can be reduced by omitting the partial products accumulation corresponding to the last part of the bits. FIG. 3 depicts a partial product generating diagram for an n-bit low-complexity reduced-width multiplier 200. Taking the product of A×B as an example, if $$A = -a_{n-1}2^{n-1} + \overset{n-2}{\underset{j=0}{a}} a_j 2^j, B = -b_{n-1}2^{n-1} + \overset{n-2}{\underset{i=0}{a}} b_i 2^i,$$

and $P_{ij}=a_j b_i$. Then the result of the multiplication can be represented as the following equation:

$$A \times B = MSP + 2^n \left( \left[ \frac{\beta}{2} + \lambda \right]_r \right) \approx MSP + 2^n \left( \left[ \frac{1}{2}(2\beta + 2\lambda - 1) \right]_r \right)$$

where $[\ ]_r$ denotes round-off.

The multiplier 200 provided by the present invention is able to reduce the complexity by omitting the partial products accumulating operation of $\lambda$, while adding an estimation of $\lambda$ to compensate for the error induced by this simplification. Because any two elements $P_{ij}^1 = a_j b_i^1$, $P_{ij} = a_j b_i$ that construct the partial product are both related to $a_j$, and $P_{ij}^1 = a_j^1 b_i^1$, $P_{ij} = a_j b_i$ are related to $b_i$, therefore, by observing the partial product accumulation value of the nth bit $$\left( B = P_{0,n-1} + P_{n-1,0} + \sum_{i=1}^{n-2} P_{i,n-i-1} = P_{0,n-1} + P_{n-1,0} + \sum_{i=1}^{n-2} P_{n-j-1,j} \right),$$

and by substituting $P_{ij}$, which constitute $\lambda$, with $E[P_{ij}|P_{i,n-i-1,}]$, or by substituting $P_{ij}$, which constitute $\lambda$, with $E[P_{ij}|P_{n-j-1,j}]$, it is possible to estimate the value of $\lambda$ that has been omitted to further compensate for this error. The quantity of compensation provided by the present invention is obtained by observing $\beta$, which corresponds to a quantity of compensation that changes dynamically in accordance with the input to an multiplier.

Figure 4:
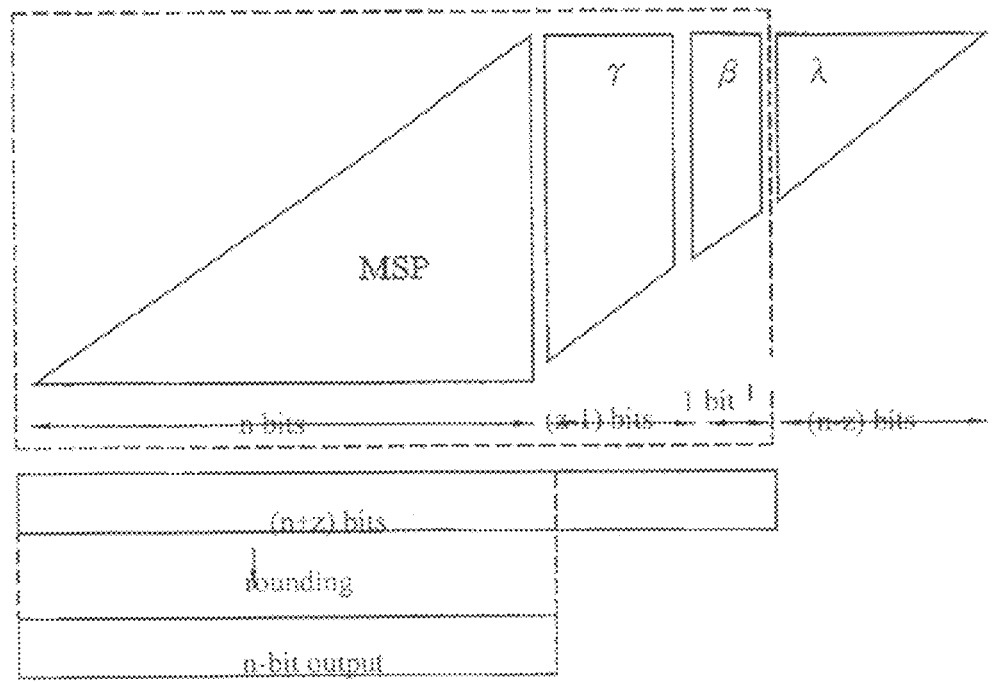
FIG. 4 depicts another partial product generating diagram for an n-bit multiplier 200.
Figures 7, 8:
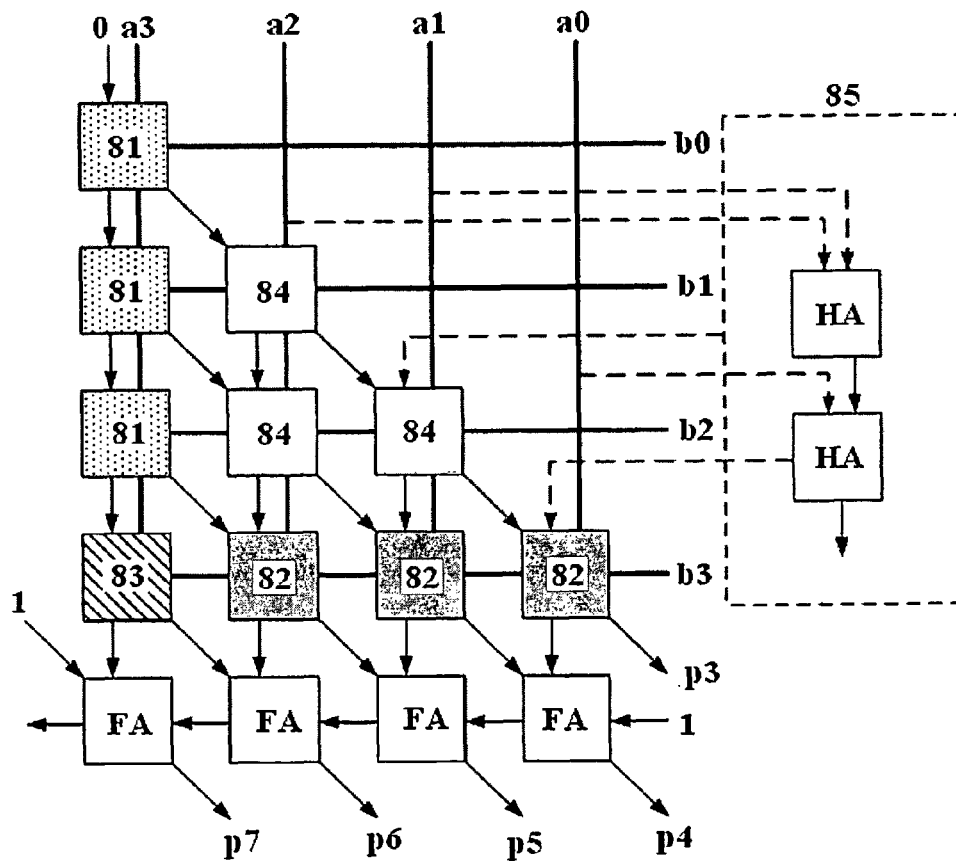
FIG. 7 depicts three kinds of diagrams of compensation generating formulae for different bit-width modified Booth multipliers.
FIG. 8 and FIG. 9 depict a first preferred embodiment for estimating a carry-in of a truncated-width multiplier, wherein FA indicated a full adder, HA indicated a half adder, $a_0 \sim a_3$ and $b_0 \sim b_3$ indicated multiplier's inputs and $p_4 \sim p_7$ indicated final multiplication results.

The multiplier provided by the present invention is capable of changing its omitting ratio of the partial product in accordance with the requested amount of error and complexity requirement of its applications or systems. FIG. 4 depicts another partial product generating diagram for an n-bit multiplier 200, where the number of percentage occupied by $\lambda$ can be determined by the parameter z. The compensation estimation method proposed by the present invention can be used with different numbers of the parameter z. The present invention also takes the 2's complement multiplier and the modified Booth multiplier as illustrating examples and provides respectively three types of compensation estimation methods for each of the multipliers. FIG. 5 and FIG. 6 depict, respectively, three kinds of diagrams of compensation generating formulae for used in different bit-width 2's complement multipliers. FIG. 7 depicts three kinds of diagrams of compensation generating formulae for different bit-width modified Booth multipliers. The present invention further provides an analysis method for analyzing the compensation C in accordance with the statistical characteristics of the input signals A, B of the multiplier.

According to the present invention, a method for carry estimation of a truncated-width multiplier is provided and comprising: (a) processing a n-bit Baugh-Wooly 2's complement multiplier and an input multiplication of A×B, where $$A = -a_{n-1}2^{n-1} + \sum_{j=0}^{n-2} a_j 2^j; B = -b_{n-1}2^{n-1} + \sum_{i=0}^{n-2} b_i 2^i,$$

with $a_j, b_i \in \{0,1\}$), to generate a first group of n partial products and a second group of n partial products; (b) associating each partial product of the first group with a most significant part (MSP) and associating each partial product of the second group with a least significant part (LSP); (c) dividing the least significant part (LSP) into two groups, a first least significant group of $$\beta = \sum_{i=0}^{n-1} P_{i,n-i-1},$$

$P_{i,j}=a_j b_i$, which contains a plurality of elements $P_{i,j}$ of partial product $P_{i,j}=a_j b_i$ depending on input information $a_j$, $b_i$, and a second least significant group containing n−1 bits; (d) truncating the second least significant group and using a compensating circuit to generate a estimated group of $$\lambda = \sum_{i=0}^{n-2} \sum_{j=0}^{n-i-2} P_{i,j} 2^{j-n}$$

in accordance with the input information implied in the first least significant group β; (e) generating a carry estimation value of $$\sigma = 2^n \left\lfloor \frac{\beta}{2} + \lambda \right\rfloor_r,$$

where $\lfloor x \rfloor_r$ is a round operation for rounding x to its nearest number, for the most significant part (MSP) in accordance with the first least significant group β and a estimated group λ; and (f) using an adder circuit to accumulate the most significant part (MSP) and the carry estimation value.

Figure 9:
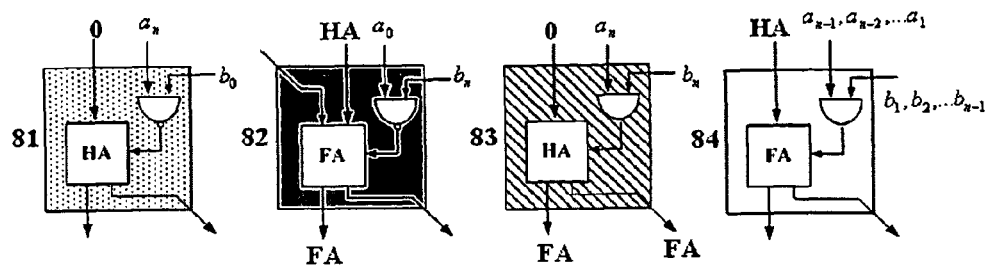

According to abovementioned method and referring to FIGS. 8~9, the compensating circuit including: a first cell 81 that comprises a half adder and a NAND logical gate receiving the input information $(a_n, b_0)$; a plurality of second cells 84, each of the second cells 84 comprises a full adder and an AND logical gate receiving the input information $(a_{n-1}, a_{n-2}, \ldots a_1, b_1, b_2, \ldots b_{n-1})$; a third cell 82 that comprising a full adder and a NAND logical gate receiving the input information $(a_0, b_n)$; and a fourth cell 85 that comprises a plurality of half adders for receiving the input information and respectively outputting the estimated group (λ) composed of $$2^{-1} \sum_{j=0}^{n-2} a_j$$

to the second cells 84 and the third cell 82. A total number of the first cell, the second cells and the third cell are equal to n, and the second cells 84 are connected between the first cell 81 and the third cell 84. The carry estimation value σ is estimated as $$\sigma = \left\lfloor \frac{1}{2} \left( \beta + \frac{1}{2} \sum_{j=0}^{n-2} a_j \right) \right\rfloor_r$$

when conditional expectation values are $E[P_{ij}|a_j=0]=0$ and $$E[P_{ij} \mid a_j = 1] = \frac{1}{2},$$

where $P_{ij}$ is generated from $a_j \times b_i$ and estimated as $$a_j \cdot E[P_{ij} \mid a_j = 1] + (1 - a_j) \cdot E[P_{ij} \mid a_j = 0] = \frac{a_j}{2}.$$

Figure 10:
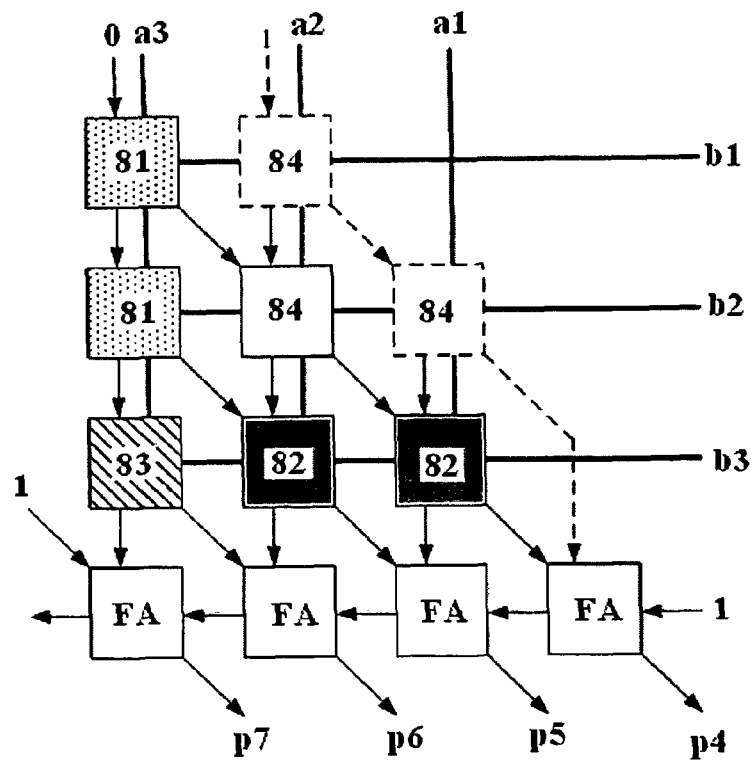
FIG. 10 depicts a second preferred embodiment for estimating a carry-in of a truncated-width multiplier, wherein FA indicated a full adder, HA indicated a half adder, $a_1 \sim a_3$ and $b_1 \sim b_3$ indicated multiplier's inputs and $p_4 \sim p_7$ indicated final multiplication results, wherein FA indicated a full adder, HA indicated a half adder.

Alternatively, referring to FIG. 10, according to a second preferred embodiment of the present invention, the compensating circuit includes a plurality of second cells 84, each of the n−2 second cells 84 comprising a full adder and an AND logical gate receiving the input information $(a_{n-1}, a_{n-2}, \ldots a_1, b_1, b_2, \ldots b_{n-1})$ and an expectation value '1'; the estimated group λ is composed of $$2^{-1} \sum_{j=0}^{n-2} \left( \frac{\alpha_j}{3} + \frac{1}{6} \right)(1 - 2^{-(n-1-j)});$$

and the carry estimation value σ is estimated as $$\sigma = \sum_{j=1}^{n-2} \alpha_j + [\delta]_r$$

when conditional expectation values of any partial product conditioned on $\alpha_j$ are $$E[P_{ij} \mid \alpha_j = 0] = \frac{1}{6} \text{ and } E[P_{ij} \mid \alpha_j = 1] = \frac{1}{2},$$

where $\alpha_j = P_{n-1-j,j}$, $$\delta = \frac{\alpha_0}{2} + \frac{\alpha_n - 1}{2} + \lambda - \frac{1}{2}\sum_{j=1}^{n-2} \alpha_j$$

and a conditional expectation $P_{ij}$ is determined as $$\alpha_j \cdot E[P_{ij} \mid \alpha_j = 1] + (1 - \alpha_j) \cdot E[P_{ij} \mid \alpha_j = 0] = \frac{\alpha_j}{2} + \frac{1}{6}.$$

Furthermore, the present invention is provided with an another method for carry estimation of a truncated-width multiplier, the method comprising: (a) processing a Booth-encoded multiplier and reducing the number of row in partial product of an input of B={$b_{n-1}, b_{n-2}, \ldots, b_0$}, where $b_{-1}$ is equal to 0, into $$\left\lfloor \frac{n}{2} \right\rfloor;$$

(b) converting an input multiplication of A×B into an another multiplication of A×y, where y={$y_{\lfloor n/2 \rfloor-1}, y_{\lfloor n/2 \rfloor-2}, \ldots, y_0$}, to generate a first group of n partial products and a second group of n partial products; (c) associating each partial product of the first group with a most significant part (MSP) and associating each partial product of the second group with a least significant part (LSP); (d) dividing the least significant part (LSP) into two groups, a first least significant group of $\beta$={$P_{0,n-1}, P_{1,n-3}, \ldots, P_{\lfloor n/2 \rfloor-1,1}$}, which contains a plurality of elements $P_{i,j}$ of partial product $P_{i,j}=a_j y_i$ depending on input information ($a_j, y_i$) and a second least significant group containing n−1 bits; (e) truncating the second least significant group and using a compensating circuit to generate a carry estimation value of $$\sigma = 2^n \left\lfloor \frac{\beta}{2} + \lambda \right\rfloor_r,$$

where $\lfloor x \rfloor_r$ is a round operation for rounding x to its nearest number, for the most significant part (MSP) in accordance with the input information implied in the first least significant group $\beta$ and a estimated group $\lambda$; and (f) using an adder circuit to accumulate the most significant part (MSP) and the carry estimation value in accordance with the first least significant group $\beta$ and the estimated group $\lambda$.

Figure 11:
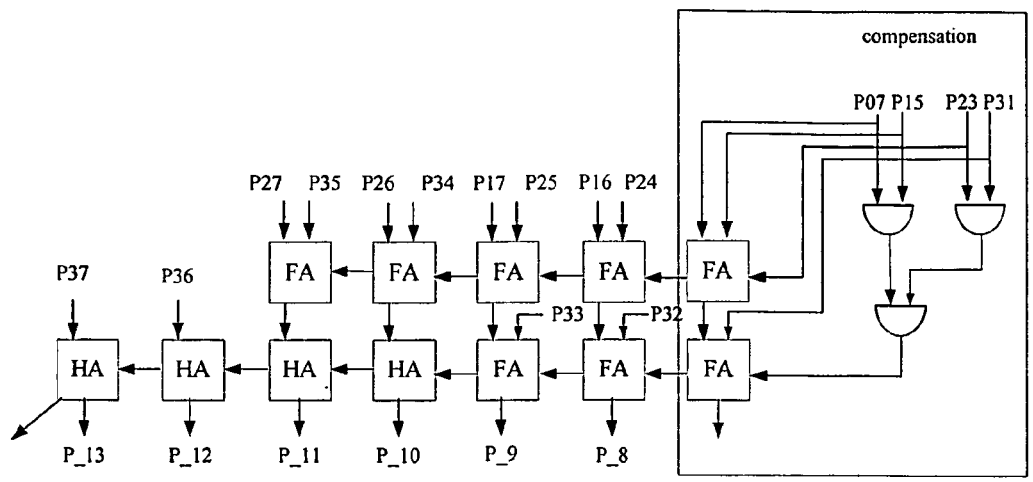
FIG. 11 depicts a third preferred embodiment for estimating a carry-in of a truncated-width multiplier, wherein FA indicated a full adder, HA indicated a half adder, P07, P15, P23 and P31 indicated the information included in the first least significant group ($\beta$).

FIG. 11 depicts a third preferred embodiment for estimating a carry-in of a truncated-width multiplier, wherein FA indicated a full adder, HA indicated a half adder, P07, P15, P23 and P31 indicated the information included in the first least significant group $\beta$.

In this preferred embodiment, the compensating circuit 111 includes: a plurality of AND logical gates for receiving an input information of the first least significant group $\beta$ and outputting the estimated group $\lambda$ composed of $$2^{-1}\left( \frac{\beta}{10} + \frac{3}{20} \left\lceil \frac{n}{2} \right\rceil \right);$$

and n/4 full adders for receiving the information of the first least significant group $\beta$ and the estimated group $\lambda$, and outputting the carry estimation value to the Booth-encoded multiplier, where $P_{ij}$ is estimated by conditional expectations of $E[P_{ij}|\beta_i]$, where $$E[P_{ij}|\beta_i=0] = \frac{3}{10}, E[P_{ij}|\beta_i=1] = \frac{1}{2},$$

$$E[n_i|\beta_i=0] = \frac{3}{10}, E[n_i|\beta_i=1] = \frac{1}{2}$$

and $n_i$ in Booth encoding equals to 1 only when $y_i$<0

Figure 12:
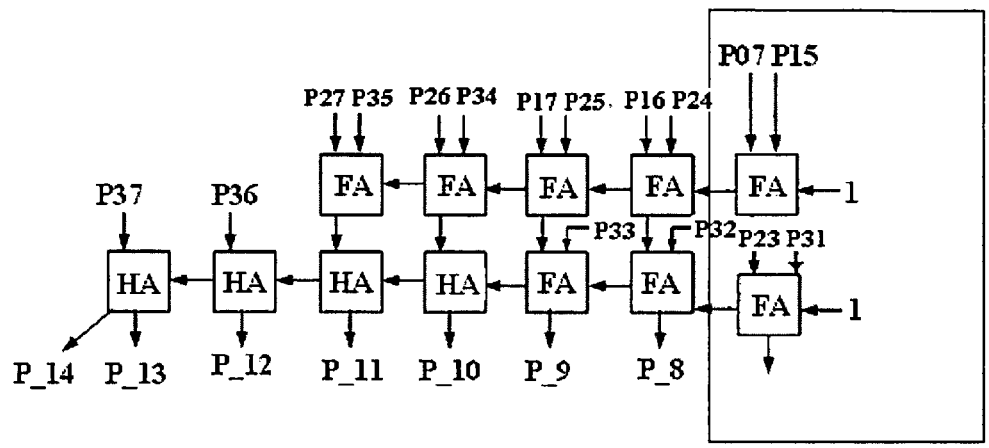
FIG. 12 depicts a fourth preferred embodiment for estimating a carry-in of a truncated-width multiplier, wherein FA indicated a full adder, HA indicated a half adder, P07, P15, P23 and P31 indicated the information included in the first least significant group ($\beta$).

FIG. 12 depicts a fourth preferred embodiment for estimating a carry-in of a truncated-width multiplier, wherein FA indicated a full adder, HA indicated a half adder, P07, P15, P23 and P31 indicated the information included in the first least significant group $\beta$.

Figure 13:
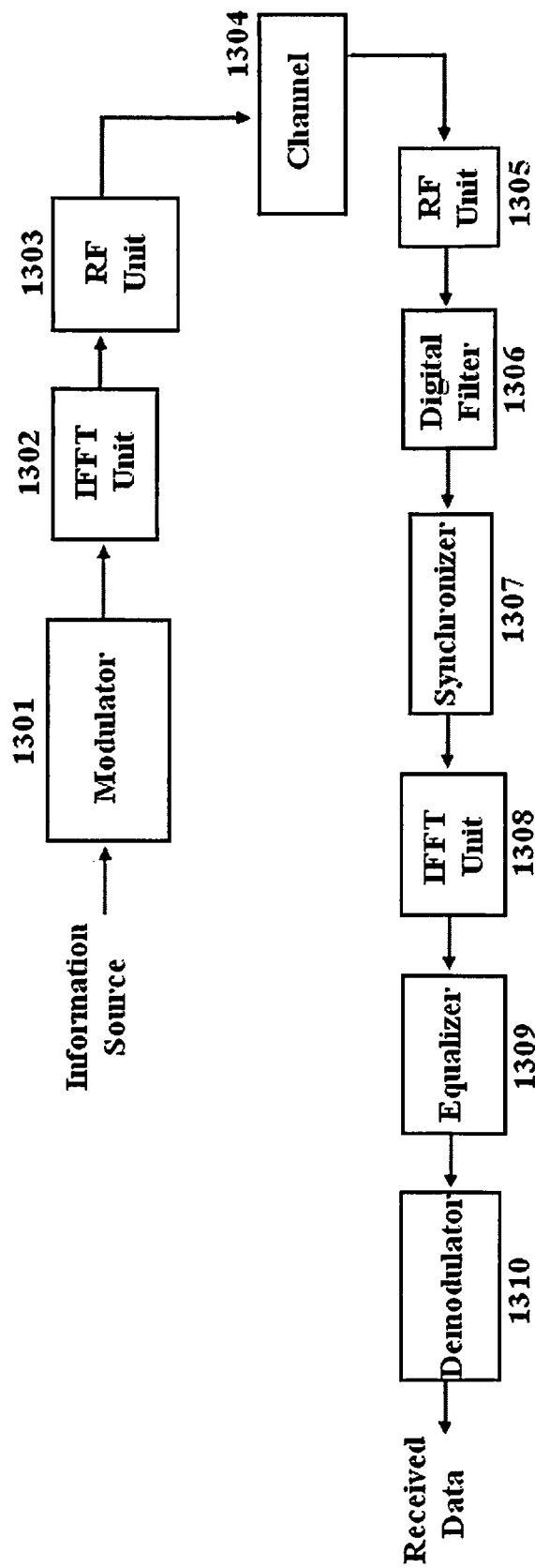
FIG. 13 depicts a simplified circuit diagram for an orthogonal frequency division multiplexing (OFDM) system.

In this preferred embodiment, the compensating circuit 121 includes n/4 full adders for receiving the input information of the first least significant group $\beta$ and the estimated group $\lambda$ composed of $$2^{-1}\left\lfloor \left( \frac{3}{8} \left\lceil \frac{n}{2} \right\rceil \right) \right\rfloor_r,$$

and outputting the carry estimation value to the Booth-encoded multiplier, where $P_{ij}$ is related to $\alpha_j$ and estimated by conditional expectations of $E[P_{ij}|\alpha_j=a_j y_i]$, where $$E[P_{ij}|\alpha_j=1] = E[P_{ij}|\alpha_j=0] = E[n_i] = \frac{3}{8}$$

and $n_i$ in Booth encoding equals to 1 only when $y_i$<0. FIG. 13 depicts a simplified circuit diagram for an orthogonal frequency division multiplexing (OFDM) system, where the information source is inputting to the modulator 1301, passing through an IFFT (Inverse Fast Fourier Transform) unit 1302, transferring from RF (radio frequency) unit 1303 through the channel 1304 to RF unit 1305, and further inputting to FFT (Fast Fourier Transform) unit 1308 through the digital filter 1306 and the synchronizer 1307, and then generating received data by adjusting the signal frequency using the equalizer 1309 and further processing by the demodulator 1310, in which a great amount of complex multipliers needed in the required correlation calculation of the synchronization of the timing sequence and the calculation and compensation of the frequency offset of the digital filter, equalizer, and synchronizer in the above-mentioned system can all be implemented by the low-complexity, low-error multipliers provided by the present invention.

To sum up, from the previous description, the low-error reduced-width multiplier and it operation method provided in the present invention, because of the utilization of an accumulating operation that use a dynamically generated compensation term to compensate for the part that is set to be a truncated part, is able to reduce the computational complexity and compensate for truncation errors, and therefore is also applicable to different types of multipliers having different bit widths and using different partial products generating methods.

Although the present invention is disclosed in a plurality of preferred embodiments described above, the inventive idea should not be limited only to those. It will be understood by those skilled in the art that various other changes in the form and details may be made without departing from the spirit and scope of the present invention. It is to be understood that various changes may be made in adapting to different embodiments without departing from the broader concepts disclosed herein and comprehended by the claims that follow.

The invention claimed is:

1. A method for carry estimation of a truncated-width multiplier, comprising:
   (a) processing a n-bit Baugh-Wooly 2's complement multiplier and an input multiplication of A×B, where $$A = -a_{n-1}2^{n-1} + \sum_{j=0}^{n-2} a_j 2^j; \quad B = -b_{n-1}2^{n-1} + \sum_{i=0}^{n-2} b_i 2^i,$$

with $a_j, b_i \in \{0,1\}$, to generate a first group of n partial products and a second group of n partial products;

(b) associating each partial product of the first group with a most significant part (MSP) and associating each partial product of the second group with a least significant part (LSP);

(c) dividing the least significant part (LSP) into two groups, a first least significant group of $$\beta = \sum_{i=0}^{n-1} P_{i,n-i-1},$$

$P_{i,j}=a_j b_i$, which contains a plurality of elements $P_{i,j}$ of partial product of $P_{i,j}=a_j b_i$ depending on input information $a_j, b_i$, and a second least significant group containing n−1 bits;

(d) truncating the second least significant group and using a compensating circuit to generate a estimated group of $$\lambda = \sum_{i=0}^{n-2} \sum_{j=0}^{n-i-2} P_{i,j} 2^{j-n}$$

in accordance with the input information included in the first least significant group β;

(e) generating a carry estimation value of $$\sigma = 2^n \left\lfloor \frac{\beta}{2} + \lambda \right\rfloor_r,$$

where $\lfloor x \rfloor_r$ is a round operation for rounding x to its nearest number, for the most significant part (MSP) in accordance with the first least significant group β and the estimated group λ; and (f) using an adder circuit to accumulate the most significant part (MSP) and the carry estimation value;

the compensating circuit including:

a first cell that comprises a half adder and a NAND logical gate receiving the input information $a_n$, $b_0$;

a plurality of second cells, each of the second cells comprising a full adder and an AND logical gate receiving the input information $a_{n-1}$, $a_{n-2}$, ... $a_1$, $b_1$, $b_2$, ... $b_{n-1}$;

a third cell comprising a full adder and a NAND logical gate receiving the input information $a_0$, $b_n$; and a fourth cell that comprises a plurality of half adders for receiving the input information and respectively outputting the estimated group λ composed of $$2^{-1} \sum_{j=0}^{n-2} a_j$$

and the third cell;

wherein a total number of the first cell, the second cells and the third cell are equal to n, and the second cells are connected between the first cell and the third cell; and the carry estimation value σ is estimated as $$\sigma = \left\lfloor \frac{1}{2}\left(\beta + \frac{1}{2}\sum_{j=0}^{n-2} a_j\right) \right\rfloor_r$$

when conditional expectation values are $E[P_{ij}|a_j=0]=0$ and $$E[P_{ij} \mid a_j = 1] = \frac{1}{2},$$

where $P_{ij}$ is generated from $a_j \times b_i$ and estimated as $$a_j \cdot E[P_{ij} \mid a_j = 1] + (1-a_j) \cdot E[P_{ij} \mid a_j = 0] = \frac{a_j}{2}.$$

2. A method for carry estimation of a truncated-width multiplier, comprising:

(a) processing a n-bit Baugh-Wooly 2's complement multiplier and an input multiplication of A×B, where $$A = -a_{n-1}2^{n-1} + \sum_{j=0}^{n-2} a_j 2^j; \quad B = -b_{n-1}2^{n-1} + \sum_{i=0}^{n-2} b_i 2^i,$$

with $a_j, b_i \in \{0,1\}$, to generate a first group of n partial products and a second group of n partial products;

(b) associating each partial product of the first group with a most significant part (MSP) and associating each partial product of the second group with a least significant part (LSP);

(c) dividing the least significant part (LSP) into two groups, a first least significant group of $$\beta = \sum_{i=0}^{n-1} P_{i,n-i-1},$$

$P_{i,j}=a_j b_i$, which contains a plurality of elements $P_{i,j}$ of partial product of $P_{i,j}=a_j b_i$ depending on input information $a_j, b_i$ and a second least significant group containing n−1 bits;

(d) truncating the second least significant group and using a compensating circuit to generate a estimated group of $$\lambda = \sum_{i=0}^{n-2} \sum_{j=0}^{n-i-2} P_{i,j} 2^{j-n}$$

in accordance with the input information included in the first least significant group β;

(e) generating a carry estimation value of $$\sigma = 2^n \left\lfloor \frac{\beta}{2} + \lambda \right\rfloor_r,$$

where $\lfloor x \rfloor_r$ is a round operation for rounding x to its nearest number, for the most significant part (MSP) in accordance with the first least significant group β and the estimated group λ; and (f) using an adder circuit to accumulate the most significant part (MSP) and the carry estimation value;

wherein the compensating circuit includes a plurality of second cells, each of the second cells comprising a full adder and an AND logical gate receiving the input information $a_{n-1}, a_{n-2}, \ldots a_1, b_1, b_2, \ldots b_{n-1}$ and an expectation value '1';

the estimated group $\lambda$ is composed of $$2^{-1} \sum_{j=0}^{n-2} \left( \frac{\alpha_j}{3} + \frac{1}{6} \right) (1 - 2^{-(n-1-j)});$$

and the carry estimation value $\sigma$ is estimated as $$\sigma = \sum_{j=1}^{n-2} \alpha_j + [\delta]_r$$

when conditional expectation values of any partial product conditioned on $a_j$ are $$E[P_{ij} \mid \alpha_j = 0] = \frac{1}{6} \text{ and } E[P_{ij} \mid \alpha_j = 1] = \frac{1}{2},$$

where $a_j = P_{n-1-j,j}$, $$\delta = \frac{\alpha_0}{2} + \frac{\alpha_n - 1}{2} + \lambda - \frac{1}{2} \sum_{j=1}^{n-2} \alpha_j$$

and a conditional expectation $P_{ij}$ is determined as $$\alpha_j \cdot E[P_{ij} \mid \alpha_j = 1] + (1 - \alpha_j) \cdot E[P_{ij} \mid \alpha_j = 0] = \frac{\alpha_j}{3} + \frac{1}{6}.$$

3. A method for carry estimation of a truncated-width multiplier, comprising:
  (a) processing a Booth-encoded multiplier and reducing the number of row in partial product of an input of $B = \{b_{n-1}, b_{n-2}, \ldots, b_0\}$, where $b_{-1}$ is equal to 0, into $$\left\lfloor \frac{n}{2} \right\rfloor;$$

(b) converting an input multiplication of A×B into another multiplication of A×y, where $$y = \{y_{\lfloor \frac{n}{2} \rfloor - 1}, y_{\lfloor \frac{n}{2} \rfloor - 2}, \ldots, y_0\},$$

to generate a first group of n partial products and a second group of n partial products;
  (c) associating each partial product of the first group with a most significant part (MSP) and associating each partial product of the second group with a least significant part (LSP);
  (d) dividing the least significant part (LSP) into two groups, a first least significant group of $$\beta = \sum_{i=0}^{\lfloor \frac{n}{2} \rfloor - 1} P_{i,n-(2i+1)},$$

which contains a plurality of elements $P_{i,j}$ of partial product of $P_{i,j} = a_j y_i$ depending on input information $a_j$, $y_i$, and a second least significant group containing n−1 bits;
  (e) truncating the second least significant group and using a compensating circuit to generate a carry estimation value of $$\sigma = 2^n \left\lfloor \frac{\beta}{2} + \lambda \right\rfloor_r,$$

where $\lfloor x \rfloor_r$ is a round operation for rounding x to its nearest number, for the most significant part (MSP) in accordance with the first least significant group $\beta$ and a estimated group $\lambda$; and
  (f) using an adder circuit to accumulate the most significant part (MSP) and the carry estimation value in accordance with the first least significant group $\beta$ and the estimated group $\lambda$;
  the compensating circuit including:
    a plurality of AND logical gates for receiving an input information of the first least significant group and outputting the estimated group $\lambda$ composed of $$2^{-1} \left( \frac{\beta}{10} + \frac{3}{20} \left\lceil \frac{n}{2} \right\rceil \right);$$

and
    n/4 full adders for receiving the information of the first least significant group $\beta$ and the estimated group $\lambda$, and outputting the carry estimation value to the Booth-encoded multiplier,
    where $P_{i,j}$ is estimated by conditional expectations of $E[P_{ij}|\beta_i]$, where $$E[P_{ij} \mid \beta_i = 0] = \frac{3}{10}, \quad E[P_{ij} \mid \beta_i = 1] = \frac{1}{2},$$
    $$E[n_i \mid \beta_i = 0] = \frac{3}{10}, \quad E[n_i \mid \beta_i = 1] = \frac{1}{2}$$

and $n_i$ in Booth encoding equals to 1 only when $y_i < 0$,
    wherein a total number of the first cell, the second cells and the third cell are equal to n, and the second cells are connected between the first cell and the third cell; and
    the carry estimation value $\sigma$ is estimated as $$\sigma = \left[ \frac{1}{2} \left( \beta + \frac{1}{2} \sum_{j=0}^{n-2} a_j \right) \right]_r$$

when conditional expectation values are $E[P_{ij}|a_j 0] = 0$ and $$E[P_{ij} \mid a_j = 1] = \frac{1}{2},$$

where $P_{ij}$ is generated from $a_j \times b_i$ and estimated as $$a_j \cdot E[P_{ij} \mid a_j = 1] + (1 - a_j) \cdot E[P_{ij} \mid a_j = 0] = \frac{a_j}{2}.$$

4. A method for carry estimation of a truncated-width multiplier, comprising:

(a) processing a Booth-encoded multiplier and reducing the number of row in partial product of an input of $B=\{b_{n-1}, b_{n-2}, \ldots b_0\}$, where $b_{-1}$ is equal to $$\lfloor \frac{n}{2} \rfloor;$$

(b) converting an input multiplication of $A \times B$ into another multiplication of $A \times y$, where $$y = \{y_{\lfloor \frac{n}{2} \rfloor - 1}, y_{\lfloor \frac{n}{2} \rfloor - 2}, \ldots, y_0\},$$

to generate a first group of n partial products and a second group of n partial products;

(c) associating each partial product of the first group with a most significant part (MSP) and associating each partial product of the second group with a least significant part (LSP);

(d) dividing the least significant part (LSP) into two groups, a first least significant group of $$\beta = \sum_{i=0}^{\lfloor \frac{n}{2} \rfloor - 1} P_{i,n-(2i+1)},$$

which contains a plurality of elements $P_{i,j}$ of partial product of $P_{i,j} = a_j y_i$ depending on input information $a_j$, $y_i$, and a second least significant group containing n−1 bits;

(e) truncating the second least significant group and using a compensating circuit to generate a carry estimation value of $$\sigma = 2^n \lfloor \frac{\beta}{2} + \lambda \rfloor_r,$$

where $\lfloor x \rfloor_r$ is a round operation for rounding x to its nearest number, for the most significant part (MSP) in accordance with the first least significant group β and a estimated group λ; and (f) using an adder circuit to accumulate the most significant part (MSP) and the carry estimation value in accordance with the first least significant group β and the estimated group λ;

wherein:
the compensating circuit includes n/4 full adders for receiving the input information of the first least significant group β and the estimated group λ composed of $$2^{-1} \lfloor \left( \frac{3}{8} \lceil \frac{n}{2} \rceil \right) \rfloor_r,$$

and outputting the carry estimation value to the Booth-encoded multiplier, where $P_{ij}$ is related to $a_j$ and estimated by conditional expectations of $E[P_{ij}|a_j=a_j y_i]$, where $$E[P_{ij} | \alpha_j = 1] = E[P_{ij} | \alpha_j = 0] = E[n_i] = \frac{3}{8}$$

and $n_i$ in Booth encoding equals to 1 only when $y_i<0$.

* * * * *